US007006319B2

(12) United States Patent
Christie, Jr. et al.

(10) Patent No.: US 7,006,319 B2
(45) Date of Patent: Feb. 28, 2006

(54) MEDIA-DETECTION SYSTEM AND METHOD FOR IDENTIFYING TYPES OF DATA CARTRIDGES

(75) Inventors: Leslie G. Christie, Jr., Greeley, CO (US); Paul C. Coffin, Battle Ground, WA (US); Robert L. Mueller, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 391 days.

(21) Appl. No.: 10/400,364

(22) Filed: Mar. 27, 2003

(65) Prior Publication Data

US 2004/0190177 A1 Sep. 30, 2004

(51) Int. Cl.
*G11B 15/68* (2006.01)
(52) U.S. Cl. ..................................................... 360/71
(58) Field of Classification Search ................ 360/71, 360/69, 92, 94, 96.5
See application file for complete search history.

(56) References Cited

U.S. PATENT DOCUMENTS

| | | | |
|---|---|---|---|
| 3,730,535 A | 5/1973 | Huber | |
| 3,735,989 A | 5/1973 | Dattilo | |
| 4,985,790 A | 1/1991 | Komatsu et al. | |
| 5,016,127 A | 5/1991 | Inoue et al. | 360/92 |
| 5,021,902 A | 6/1991 | Ishikawa et al. | |
| 5,231,553 A * | 7/1993 | Weber et al. | 360/94 |
| 5,309,308 A | 5/1994 | Nakagawa et al. | |
| 5,396,381 A * | 3/1995 | Yamano et al. | 360/94 |
| 5,416,650 A * | 5/1995 | Otonomiya et al. | 360/94 |
| 5,652,682 A | 7/1997 | Elliott | |
| 5,675,451 A * | 10/1997 | d'Alayer et al. | 360/94 |
| 6,031,676 A | 2/2000 | Oenes et al. | 360/94 |
| 6,219,313 B1 | 4/2001 | Ries et al. | |
| 6,229,772 B1 | 5/2001 | Kumagai et al. | |
| 6,262,960 B1 | 7/2001 | Watanabe | |
| 6,213,705 B1 | 10/2001 | Kulakowski et al. | |
| 6,297,924 B1 | 10/2001 | Thomas, III et al. | |
| 6,298,017 B1 | 10/2001 | Kulakowski et al. | |
| 6,349,013 B1 * | 2/2002 | Ichimura | 360/94 |
| 6,603,725 B1 | 8/2003 | Sanada et al. | |
| 6,710,962 B1 * | 3/2004 | Caverly et al. | 360/71 |
| 6,771,457 B1 * | 8/2004 | Flaherty et al. | 360/92 |
| 2002/0006030 A1 * | 1/2002 | Evanson et al. | 361/724 |
| 2004/0105352 A1 | 6/2004 | Christie, Jr. et al. | |

FOREIGN PATENT DOCUMENTS

| | | |
|---|---|---|
| EP | 0288165 | 10/1988 |
| EP | 0566351 A2 | 10/1993 |
| EP | 0 788 100 | 8/1997 |

(Continued)

OTHER PUBLICATIONS

U.S. Appl. No. 09/791,107, filed Feb. 22, 2001, Inventor—Paul C. Coffin, et al., for invention entitled "Apparatus and Method for Retaining Different Sizes of Data Cartridges in a Storage Magazine".

(Continued)

*Primary Examiner*—David Hudspeth
*Assistant Examiner*—James L. Habermehl

(57) ABSTRACT

A media-detection system and method for identifying a type of data cartridge. According to one embodiment, the media-detection system comprises at least one indicator arm displaceable by at least one surface feature of the data cartridge as the data cartridge is loaded in a cartridge-receiving device. The media-detection system also comprises at least one sensor detecting the displacement of the at least one indicator arm as the data cartridge is loaded, thereby indicating the type of data cartridge in the cartridge-receiving device.

21 Claims, 9 Drawing Sheets

FOREIGN PATENT DOCUMENTS

| | | |
|---|---|---|
| EP | 00884725 A2 | 6/1998 |
| EP | 1 426 946 | 9/2004 |
| GB | 1310601 | 3/1969 |
| GB | 1506778 | 7/1974 |
| GB | 2352865 | 2/2001 |
| JP | 03104047 A * | 5/1991 |
| JP | 06 131780 | 5/1994 |
| JP | 06-150492 | 5/1994 |
| JP | 63-061482 | 3/1998 |
| WO | WO 01/78077 | 10/2001 |

OTHER PUBLICATIONS

European Search Report, dated Feb. 8, 2005, pp. 1-3.

* cited by examiner

US 7,006,319 B2

MEDIA-DETECTION SYSTEM AND METHOD FOR IDENTIFYING TYPES OF DATA CARTRIDGES

FIELD OF THE INVENTION

The invention generally pertains to media-detection systems, and more specifically, to media-detection systems and methods for identifying types of data cartridges.

BACKGROUND OF THE INVENTION

Media storage systems are commonly used to store data cartridges at known locations and to retrieve the desired data cartridges so that data may be written to and/or read from the data cartridges. Such media storage systems are often referred to as autochangers or library storage systems.

A typical autochanger or media storage system may include one or more different types of cartridge-receiving devices. For example, one type of cartridge-receiving device may comprise an individual cartridge storage location (e.g., for holding a single data cartridge) or a storage rack or "magazine" (e.g., for holding a plurality of data cartridges). Another type of cartridge-receiving device may comprise one or more cartridge read/write devices for reading data from and/or writing data to data cartridges. Yet another type of cartridge-receiving device is a cartridge-engaging assembly or "picker". The cartridge-engaging assembly is provided for transporting the data cartridges in the media storage system (e.g., between the storage magazines and the read/write device).

In use, it is often useful to know which type of data cartridge is present in the cartridge-receiving device. For example, if a linear tape open (LTO) data cartridge is being retrieved for a read/write operation, it may be necessary to deliver the data cartridge to a read/write device designed for LTO data cartridges. Alternatively, if a digital linear tape (DLT) or super digital linear tape (SDLT) data cartridge is being retrieved for a read/write operation, it may be necessary to deliver the data cartridge to different read/write devices designed for either the DLT or SDLT data cartridges. Current approaches rely on separation of the different types of data cartridges in separate media storage systems.

SUMMARY OF THE INVENTION

An embodiment of a media-detection system comprises at least one indicator arm displaceable by at least one surface feature of the data cartridge as the data cartridge is loaded in a cartridge-receiving device. At least one sensor detects the displacement of the at least one indicator arm as the data cartridge is loaded, thereby indicating the type of data cartridge in the cartridge-receiving device.

An embodiment of a method for identifying a type of data cartridge comprises: receiving the data cartridge in the cartridge-receiving device, detecting a state of at least one indicator arm while the data cartridge is being received in the cartridge-receiving device, and determining the type of data cartridge being received in the cartridge-receiving device based on the state of the at least one indicator arm.

BRIEF DESCRIPTION OF THE DRAWINGS

Illustrative and presently preferred embodiments of the invention are shown in the drawings, in which.

DETAILED DESCRIPTION

Figure 1:
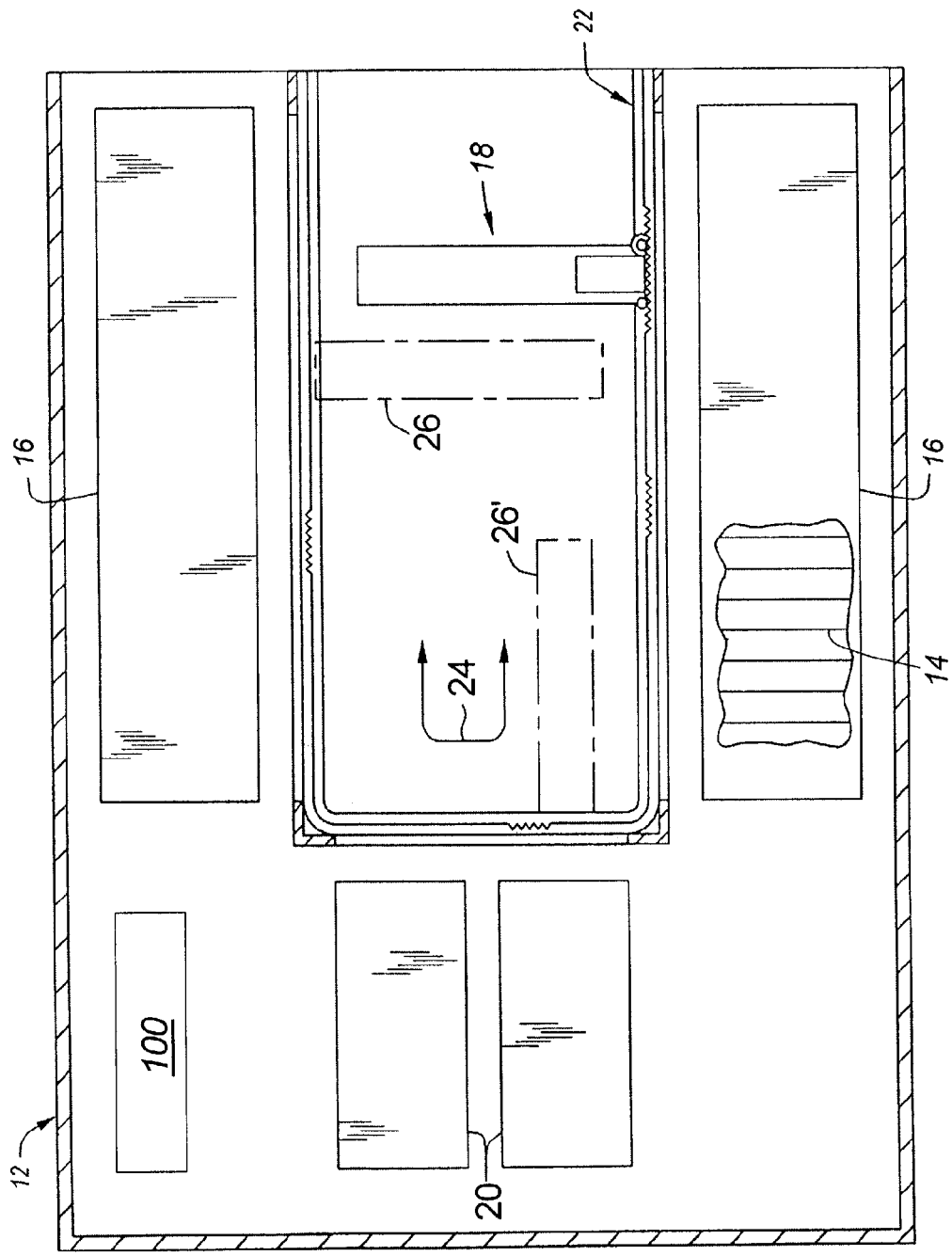
FIG. 1 is a plan view of a media storage system as it may be used according to one embodiment of the invention to store and access data cartridges therein.
Figure 2:
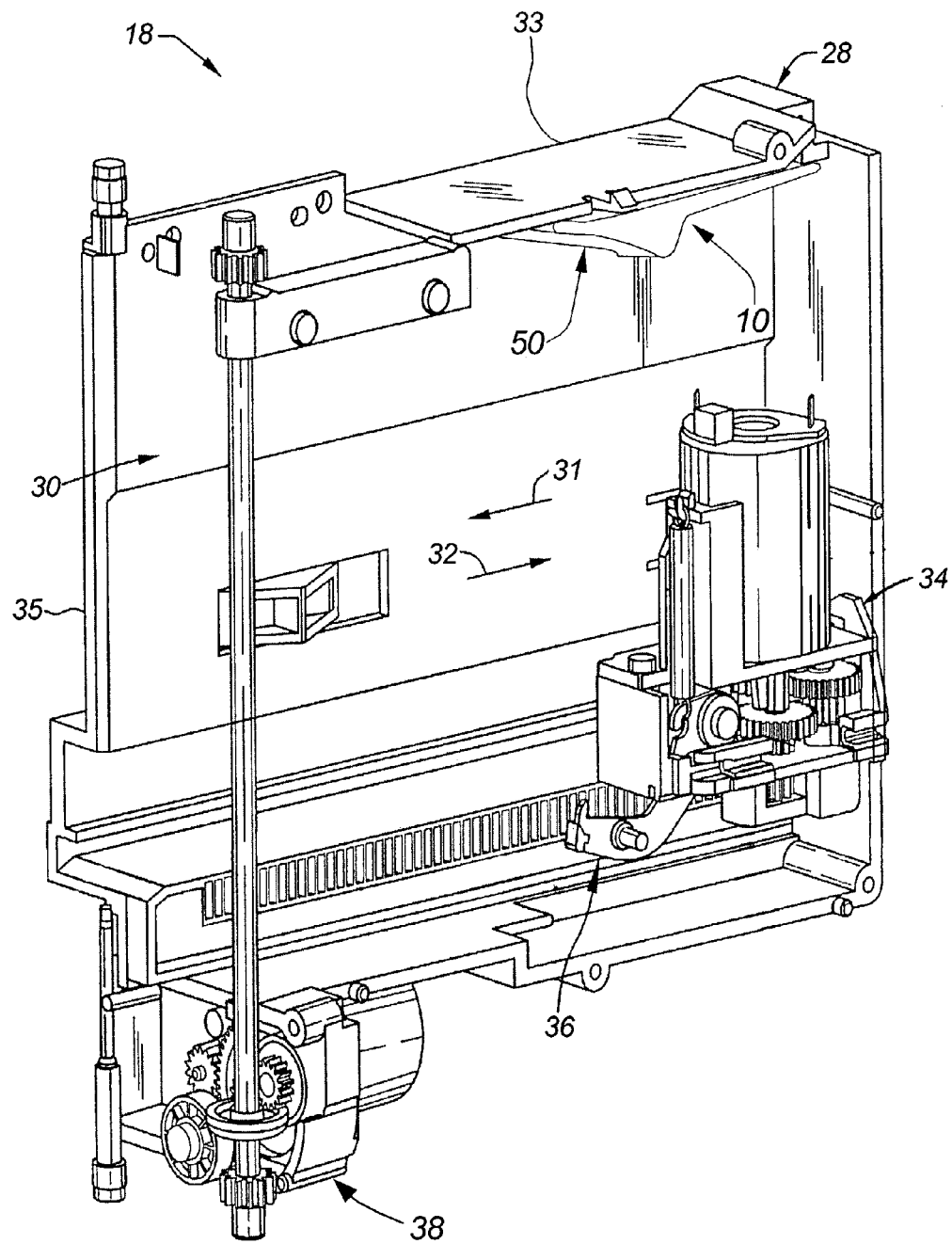
FIG. 2 is a perspective view of one embodiment of a cartridge-engaging assembly that may be used to retrieve and transport data cartridges in the media storage system of FIG. 1, showing one embodiment of the media-detection system for use therewith.
Figure 3A:
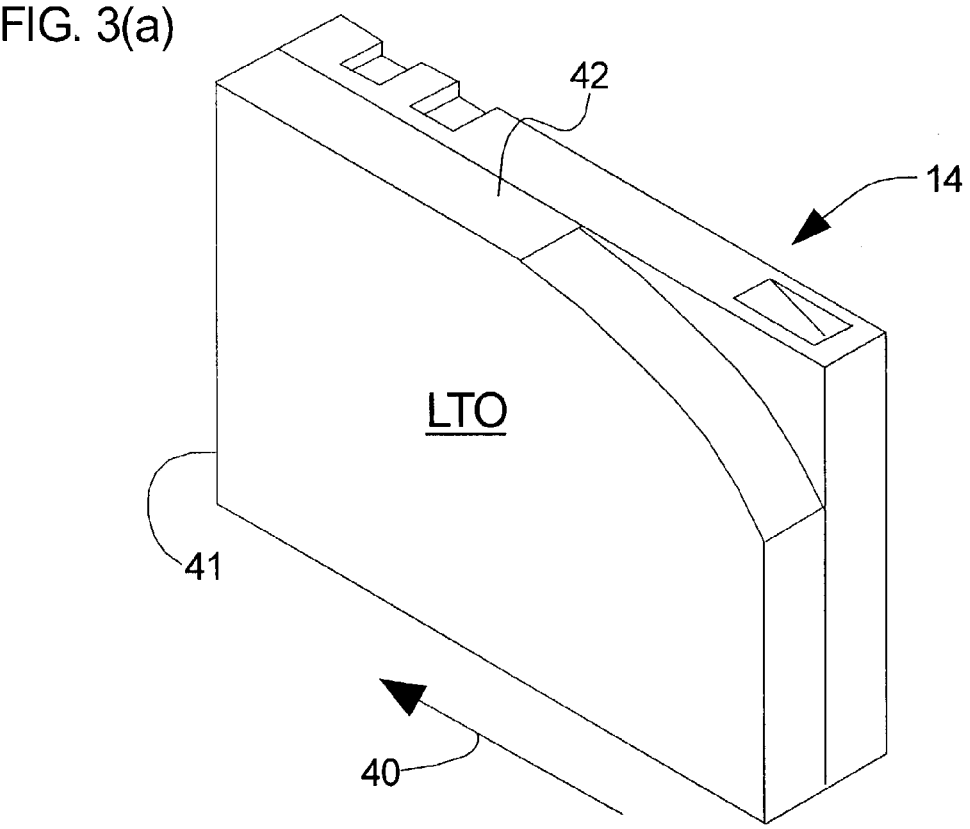
FIGS. 3(a) through 3(c) are perspective views of (a) linear tape open (LTO), (b) digital linear tape (DLT), and (c) super digital linear tape (SDLT) data cartridges.
Figure 3B:
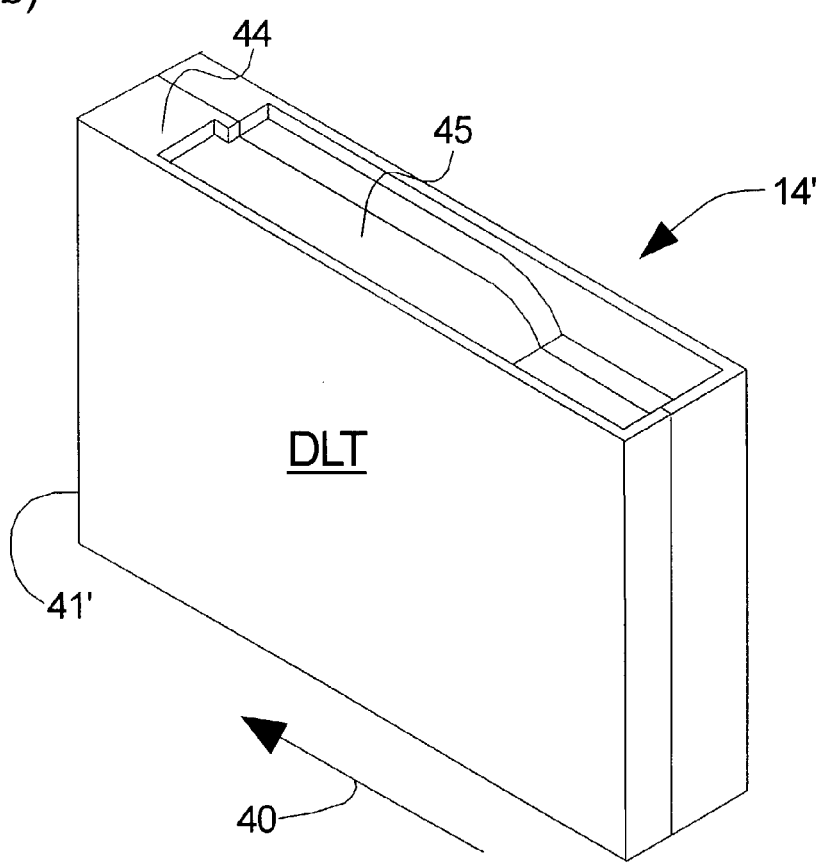
Figure 3C:
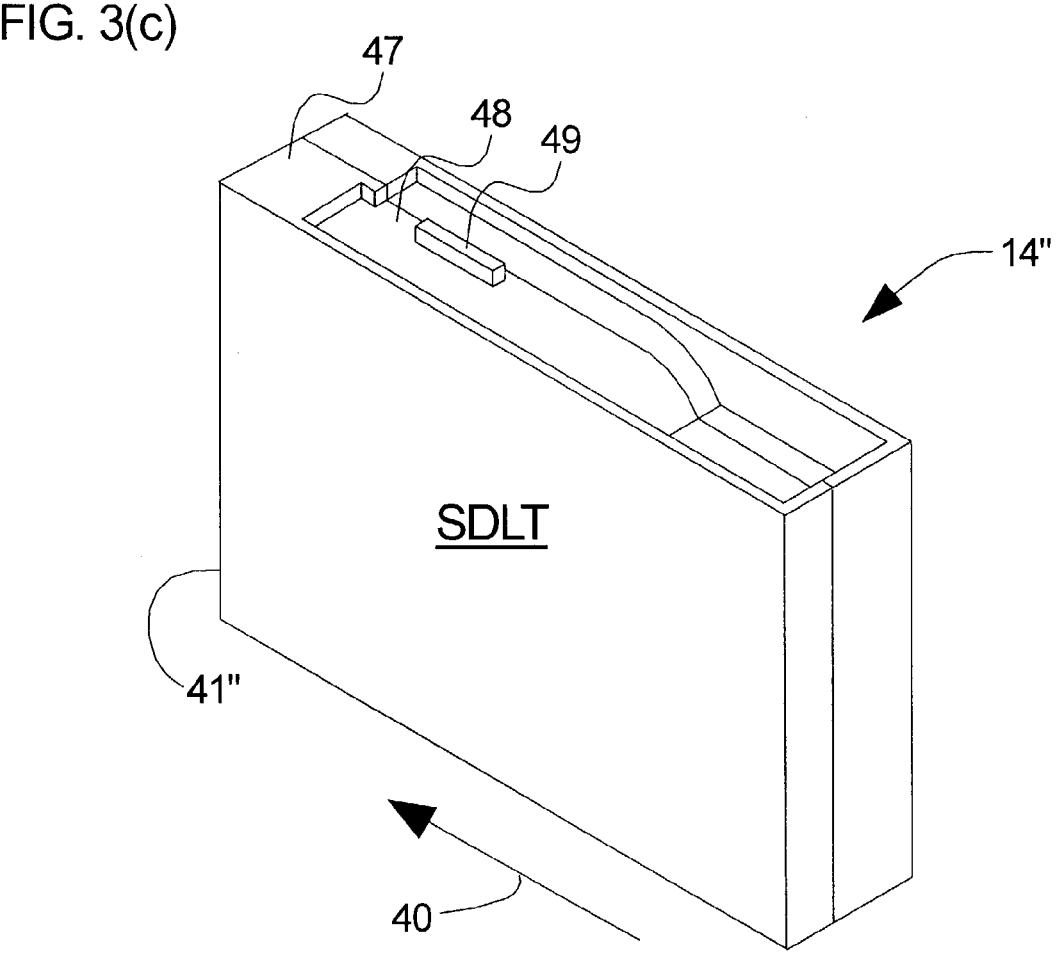

An embodiment of a media-detection system 10 (FIG. 2) is shown and described herein as it may be used in media storage system 12 (FIG. 1) for identifying types of data cartridges 14 (e.g., FIG. 3(a) through FIG. 3(c)).

Briefly, media storage systems 12 are used to store large volumes of computer readable data. The computer readable data is typically stored on multiple data cartridges 14 in the media storage system 12. One or more storage magazines 16 may be arranged in the media storage system 12, for example, in the generally U-shaped configuration shown in FIG. 1, although other arrangements are also possible. The media storage system 12 also includes a cartridge-engaging assembly 18 that can be operated to retrieve and transport data cartridges 14 between the storage magazines and read/write device(s) 20.

As an illustration of the use of the media storage system 12, a host computer may issue a request to access one of the data cartridges 14 stored in storage magazine 16 to read and/or write data thereto. In response, a control system 100 causes the cartridge-engaging assembly 18 to move along a positioning rail 22 (i.e., in the directions of arrow 24) until the cartridge-engaging assembly 18 is positioned adjacent the requested data cartridge 14 (e.g., at position 26). Once positioned, the controller 100 signals the cartridge-engaging assembly 18 to withdraw the data cartridge 14 from the storage magazine 16. The control system 100 then causes the cartridge-engaging assembly 18 to move along the positioning rail 22 until it is adjacent the read/write device 20 (e.g., at position 26'), where the data cartridge 14 is unloaded for a read and/or write operation.

An exemplary cartridge-engaging assembly 18, for use with the media storage system 12, is shown in FIG. 2 with one side removed. The cartridge-engaging assembly 18 may comprise a frame assembly 28 having sidewalls 35 and top and bottom walls 33. Frame assembly 28 defines a cavity or chamber 30 therein, which is sized to receive a data cartridge 14 (e.g., for carrying it to the read/write device 20).

A cartridge-plunge mechanism 34 is slidably mounted to the frame assembly 28 so that the cartridge-plunge mechanism 34 may be extended and retracted in the directions illustrated by arrows 31, 32, respectively. Cartridge-plunge mechanism 34 may also be provided with a finger assembly 36 configured to engage data cartridges 14. Movement of the cartridge-engaging assembly 18 may be achieved via actuator system 38 that moves the cartridge-engaging assembly 18 along the U-shaped path defined in the media storage system 12 by the positioning rail 22.

The foregoing description of the media storage system 12 and cartridge-engaging assembly 18 is provided in order to better understand one environment in which the invention may be used. However, it should be understood that the invention may be used in any of a wide range of other types of media storage systems, and in conjunction with any of a wide range of cartridge-engaging assemblies now known or that may be developed in the future. Consequently, the invention should not be regarded as being limited to use with the particular media storage system 12 and cartridge-engaging assembly 18 shown and described herein.

According to the invention, more than one type of storage media may be used at the same time in a "mixed" media storage system 12. Three different types of data cartridges 14, 14', and 14" are shown for purposes of illustration in FIGS. 3(a)–3(c), as they may be used according to the teachings of the invention in media storage system 12. It is noted that the data cartridges will be generally referred to herein as data cartridges 14 unless reference is being made to one of the particular types of data cartridges shown. It is also noted that the data cartridges 14 are preferably loaded into the cartridge-engaging assembly 18 in the direction generally illustrated by arrow 40, however, it is understood that the invention is not limited to such a direction.

FIG. 3(a) illustrates an example of an LTO data cartridge 14. The LTO data cartridge 14 may be characterized as having a generally flat surface 42 extending from the leading edge 41 to about mid-way along the top edge of the LTO data cartridge 14.

FIG. 3(b) illustrates an example of a DLT data cartridge 14'. The DLT data cartridge 14' may be characterized as having a generally flat surface 44 extending from the leading edge 41' for about 1 inch along the top edge of the DLT data cartridge 14', and then a depression 45 formed in the top edge of the DLT data cartridge 14'.

FIG. 3(c) illustrates an example of an SDLT data cartridge 14". The SDLT data cartridge 14' may be characterized as having a generally flat surface 47 extending from the leading edge 41" for about 1 inch along the top edge of the SDLT data cartridge 14", and then a depression 48 formed in the top edge of the DLT data cartridge 14'. In addition, the SDLT data cartridge 14" is characterized by a tab 49 formed in or otherwise provided in the depression 48 and spaced about 1.5 inches from the leading edge 41" of the data cartridge 14".

While the invention is shown and described herein as it could be used to store and retrieve LTO, DLT, and SDLT data cartridges (14, 14', and 14") having standard sizes and configurations, the invention is not limited to any particular type or style of data cartridge. Consequently, the present invention should not be regarded as limited to use with LTO, DLT, and SDLT data cartridges. Suitable modifications can be readily made by one skilled in the art after having become familiar with the teachings of the present invention so that it can be used to detect other types of data cartridges based on surface features unique to those types of data cartridges.

Figure 4A:
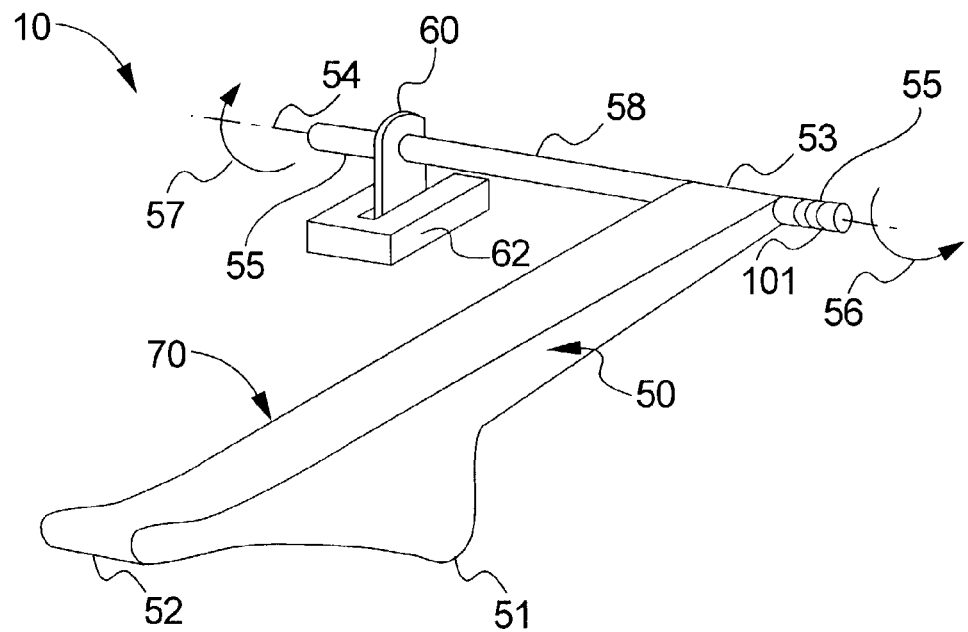
FIGS. 4(a) and 4(b) are perspective views of one embodiment of media-detection system in (a) a raised position, and (b) a lowered position.
Figure 4B:
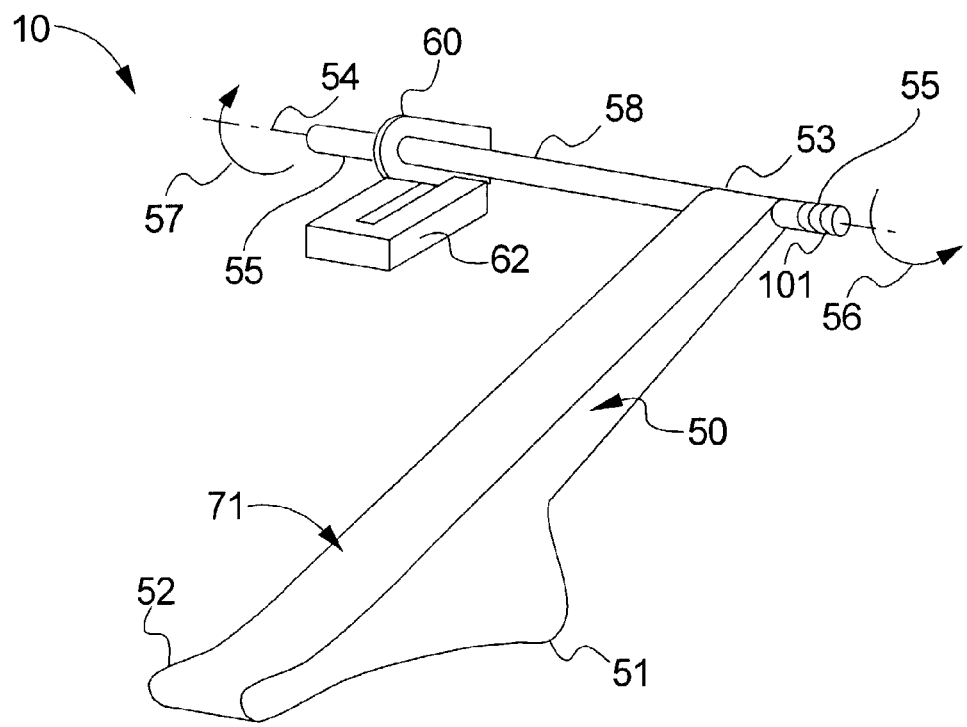

In order to determine the type of data cartridge 14 present in the cartridge-engaging assembly 18, the cartridge-engaging assembly 18 may be provided with media-detection system 10 (FIG. 2), which is shown in more detail by itself in FIGS. 4(a) and 4(b).

Media-detection system 10 is shown according to one embodiment in FIG. 2 mounted in chamber 30 of the cartridge-engaging assembly 18. Preferably, media-detection system 10 is pivotally mounted to the cartridge-engaging assembly 18. For example, media-detection system 10 may comprise an indicator arm 50 mounted to a rod member 58, as shown in FIGS. 4(a) and 4(b). The rod member 58 may have pins 55 on each end thereof which may be inserted into an opening formed on each side of chamber 30 (e.g., in sidewalls 35). Accordingly, the indicator arm 50 may be pivoted about axis 54 in downward direction illustrated by arrow 56 and in upward direction illustrated by arrow 57.

An embodiment of indicator arm 50 is shown in FIG. 4(a) having an indicator portion 51, head portion 52, and end portion 53. When data cartridge 14 is received in chamber 30 of the cartridge-engaging assembly 18, head portion 52 contacts the leading edge 41 of the data cartridge 14, displacing the indicator arm 50 as indicator portion 41 travels over one or more surface features of the data cartridge 14 (e.g., surface 42, 44, 47, depression 45, 48, and tab 49). Preferably, the indicator arm 50 is resiliently biased downward (e.g., by spring member 101 or other suitable means) in position 71 (FIG. 4(b)) and moves upward to the raised position 70 (FIG. 4(a)) as raised surface features on the top surface of data cartridges 14 (e.g., "lip" 44 in FIG. 3(b)) are encountered.

Of course indicator arm 50 is not limited to any particular design. For example, head portion 51 may be provided with a roller or bearing member mounted to the head portion 52 to engage data cartridge 14 as data cartridge 14 is received in chamber 30. Likewise, indicator arm 50 may be mounted in any suitable manner and is not limited to that described herein. The particular design and mounting of indicator arm 50 will depend upon various design considerations, such as, but not limited to, the desired resiliency, durability, and cost of manufacture.

Media-detection system 10 may also comprise a flag 60 mounted to indicator arm 50 and operatively associated with sensor 62. Flag 60 is movable into and out of the detection range of sensor 62 when the indicator arm 50 pivots about axis 54, indicating the displacement of the indicator arm 50 to the sensor 62. For example, in FIG. 4(a), the indicator arm 50 is shown in a raised position 70, wherein the flag is in range of the sensor 62 (e.g., blocking an optical path). In FIG. 4(b), the indicator arm 50 is shown in a lowered position 71, wherein the flag is out of range of the sensor 62 (e.g., the optical path is not blocked).

Other embodiments are also contemplated as being within the scope of the invention. For example, more than one optical path may be used to more finely detect displacement of indicator arm 50. In another embodiment, the flag may be in range of the sensor 62 (e.g., blocking an optical path) when the indicator arm 50 is in a lowered position and the flag may be out of range of the sensor 60 (e.g., the optical path is not blocked) when the indicator arm 50 is in a raised position. In any event, the displacement or state of the indicator arm 50 may be used to determine the type of data cartridge 14 received in chamber 30, as will be explained in more detail below.

Sensor 62 may be mounted to one of the sidewalls 35 of the cartridge-engaging assembly 18 in such a manner that flag 60 is movable into and out of the detection range of the sensor 62 when indicator arm 50 rotates in the directions of arrows 56 and 57. It is noted, however, that sensor 62 may be mounted to cartridge-engaging assembly 18 in any suitable manner. Indeed, sensor 62 need not be mounted to one of the sidewalls 35 of cartridge-engaging assembly 18 and can instead be mounted to the top wall 33.

Any suitable sensor 62 may be used to determine the position of flag 60. Generally, sensor 62 may comprise a signal emitter and a signal detector. The sensor 62 determines the position of the flag 60 based on signals it receives. It is also noted that any suitable flag 60 may be used with sensor 62 according to the teachings of the invention.

In one embodiment, sensor 62 may comprise one or more light emitting diodes (LEDs) or other suitable light source and one or more photo-detectors positioned opposite the light source. The flag 60 may be manufactured from an opaque material and assembled so that it moves between the light source and photo-detector(s). The flag 60 may thus block all or a portion of the optical path between the light source and the photo-detector. Accordingly, sensor 62 is used to detect the position of flag 60.

In another embodiment, the sensor 62 may comprise a mechanical limit switch that can be "thrown" or otherwise activated by movement of flag 60. Yet other embodiments are also contemplated as being within the scope of the invention.

Figure 5A:
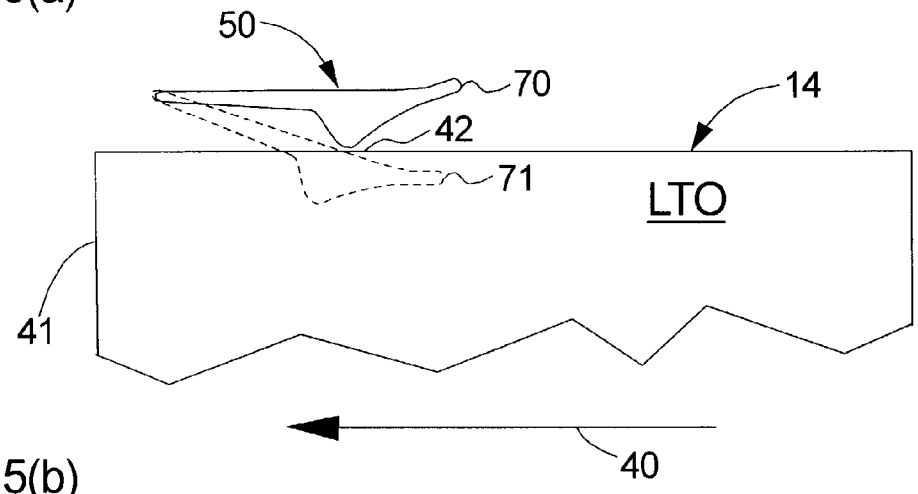
FIGS. 5(a) through FIG. 5(c) are simplified side-views of the media-detection system shown in FIGS. 4(a) and 4(b) illustrating operation thereof according to one embodiment.
Figure 5B:
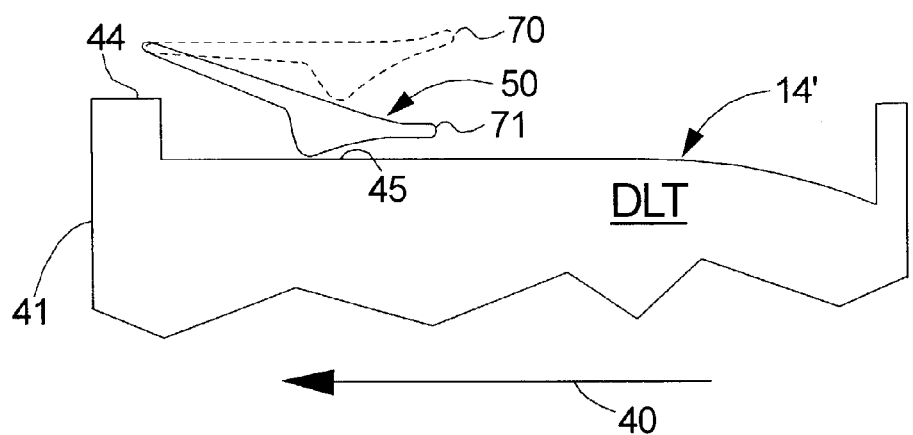
Figure 5C:
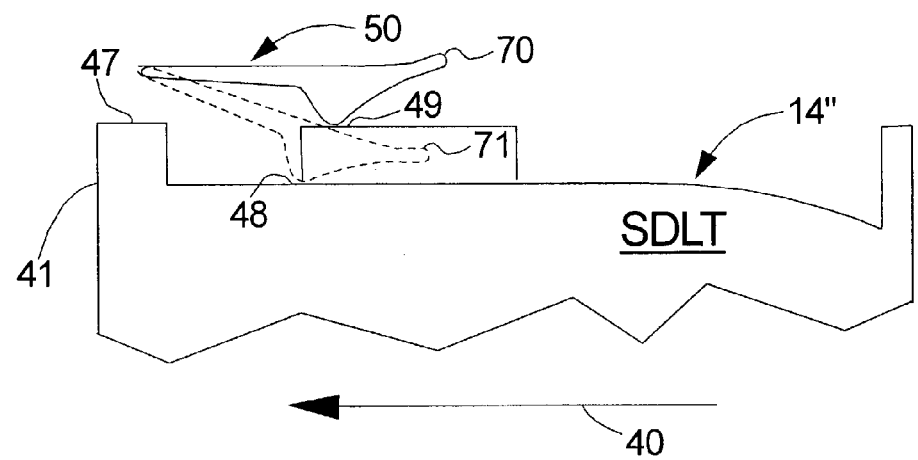

Operation of media detection system 10 according to one embodiment of the invention is illustrated in FIG. 5(a) through FIG. 5(c). In FIG. 5(a), LTO data cartridge 14 is shown as it may be loaded into the cartridge-engaging assembly 18 (illustrated by arrow 40). Indicator arm 50 is initially biased in lower position 71, and the flag 60 is out of range of the sensor 62 (e.g., in a "LOW" state). As LTO data cartridge 14 is loaded into chamber 30, indicator arm 50 comes into contact with the leading edge 41 of data cartridge 14, whereupon indicator arm 50 is displaced and moves upward toward raised position 70. In this position, the flag 60 is in range of sensor 62 (e.g., in a "HIGH" state), where it remains during loading of the LTO data cartridge 14. Accordingly, in this example, an LTO-type data cartridge 14 is present in chamber 30 when sensor 62 detects a "LOW" state, followed by a "HIGH" state during the loading operation.

In FIG. 5(b), DLT data cartridge 14' is shown as it may be loaded into the cartridge-engaging assembly 18 (illustrated by arrow 40). When chamber 30 is empty, indicator arm 50 is initially biased in lower position 71 and flag 60 is out of range of the sensor 62 (e.g., in a "LOW" state). As DLT data cartridge 14' is loaded into chamber 30, indicator arm 50 comes into contact with the leading edge 41' of DLT data cartridge 14', displacing indicator arm 50 so that it moves into raised position 70. When the indicator arm 50 is in the raised position 70, flag 60 is in range of the sensor 62 (e.g., in a "HIGH" state). As the DLT data cartridge 14' is loaded, the indicator arm 50 moves into depression 45 formed in the top surface of DLT data cartridge 14' (e.g., position 71), and flag 60 moves out of range of sensor 62 (e.g., returning to a "LOW" state). Accordingly, in this example the states "LOW", "HIGH", and then "LOW" detected during the loading operation correspond to the DLT-type data cartridge 14.

In FIG. 5(c), SDLT data cartridge 14" is shown as it may be loaded into the cartridge-engaging assembly 18 (illustrated by arrow 40). Again, when chamber 30 is empty, indicator arm 50 is initially biased in lower position 71 and flag 60 is out of range of the sensor 62 (e.g., in a "LOW" state). As SDLT data cartridge 14" is loaded into chamber 30, indicator arm 50 comes into contact with the leading edge 41" of SDLT data cartridge 14" and displaces indicator arm 50. Indicator arm 50 moves into raised position 70, wherein flag 60 is in range of the sensor 62 (e.g., in a "HIGH" state). As the SDLT data cartridge 14" is loaded into chamber 30, the indicator arm 50 moves into depression 48 formed in the top surface of SDLT data cartridge 14 (e.g., position 71). The flag 60 moves out of range of the sensor 62 and returns to a "LOW" state. The SDLT data cartridge 14" has a tab 49 in depression 48. When indicator arm 50 comes into contact with tab 49, it once again returns to the raised position 70 and flag 60 moves into range of the sensor 62 (e.g., in a "HIGH" state). Accordingly, in this example the states "LOW", "HIGH", "LOW", and then "HIGH" detected during the loading operation correspond to the SDLT-type data cartridge 14".

A control system 100 (e.g., comprising computer-readable program code stored on computer-readable storage media) may be operatively associated with media-detection system 10. The control system 100 receives the signal detected by sensor 62 and determines the type of data cartridge 14 received in the cartridge-engaging assembly 18 (e.g., using a "look-up" table). For example, the control system interprets the detected states "LOW" and then "HIGH" during the loading operation as an LTO-type data cartridge 14; "LOW", "HIGH", then "LOW" again during the loading operation as a DLT-type data cartridge 14' ; and "LOW", "HIGH", "LOW", and then "HIGH" again during the loading operation as an SDLT-type data cartridge 14". Accordingly, the control system can determine, track and manage (e.g., deliver the data cartridges to appropriate read/write devices) different or mixed media types in the same media storage system 12.

According to another embodiment, the media-detection system 10 may be operated wherein the state of the indicator arm 50 is determined with respect to distance. The control system may poll sensor 62 when the data cartridge 14 is at one or more predetermined positions in chamber 30. For example, the control system may poll sensor 62 when the data cartridge 14 is loaded about 1 inch, again at about 1.5 inches, and again at 2 inches. The state of the indicator arm 50 at each of the predetermined distances may be used to determine the type of data cartridge 14 loaded into chamber 30. The position of the data cartridge 14 can be readily determined (e.g., based on the position of the cartridge-plunge mechanism 34) using, for example, optical, electrical, and/or mechanical position sensors that are readily available, or others which may become available, for use with the cartridge-engaging assembly 18.

Although the above illustration is discussed in regard to two states (i.e., "HIGH" and "LOW"), as illustrated in FIG. 5(a) through FIG. 5(c). Suitable modifications to the media-detection system 10 can readily be made by one skilled in the art after having become familiar with the teachings of the invention. For example, the sensor 62 may also detect "MEDIUM", "VERY LOW", and/or "VERY HIGH" states.

Figure 6:
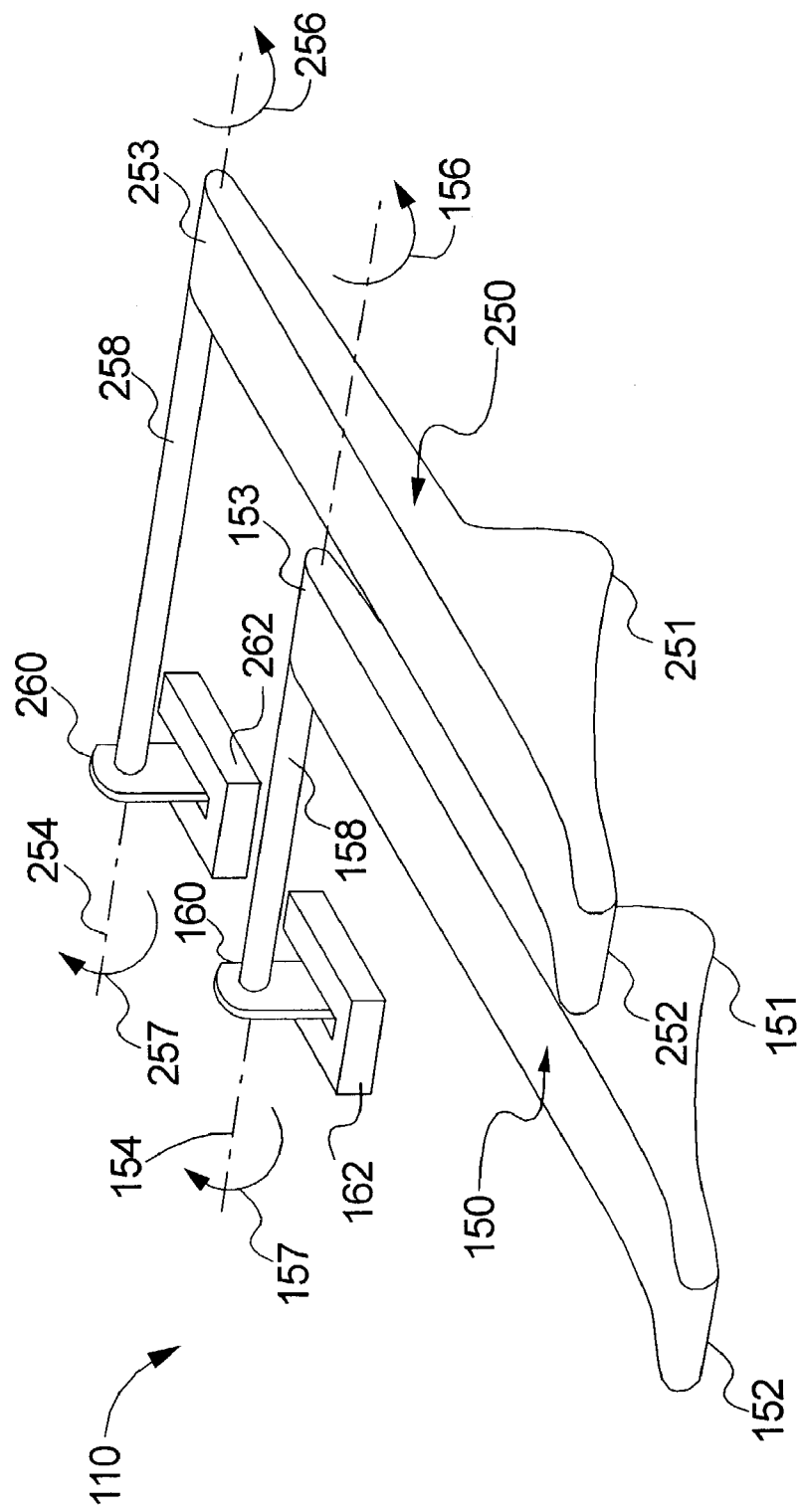
FIG. 6 is a perspective view of another embodiment of the media-detection system.

Another embodiment of media-detection system 110 is shown in FIG. 6. It is noted that one-hundred and two-hundred series reference numbers are used to refer to like elements.

Media-detection system 110 may comprise two indicator arms 150, 250. Although not shown, media-detection system 110 may also have pins 55 and be mounted in chamber 30 of the cartridge-engaging assembly 18 similarly to that described for media-detection system 10. Preferably, media-detection system 110 is mounted so that each indicator arm 150, 250 is pivotable about axis 154, 254, respectively. Also preferably, indicator arms 150, 250 are resiliently biased (e.g., by a spring member) downward toward a lower position 171, 271 (see FIG. 7(b)). Accordingly, when data cartridges 114 are received in, or removed from chamber 30 of the cartridge-engaging assembly 18, the indicator arms 150, 250 are displaced by surface features of the data cartridge 114 (e.g., surface 142, depression 145, 148, and tab 149 in FIGS. 7(a)–7(b)).

Media-detection system 10 may also comprise flags 160, 260 mounted to respective indicator arms 150, 250 and operatively associated with respective sensors 162, 262. Accordingly, flags 160, 260 move into and out of the detection range of respective sensors 162, 262, indicating the displacement of each of the indicator arms 150, 250. The displacement or state of the indicator arms 150, 250 may be used to determine the type of data cartridge 14 received in chamber 30.

Figure 7A:
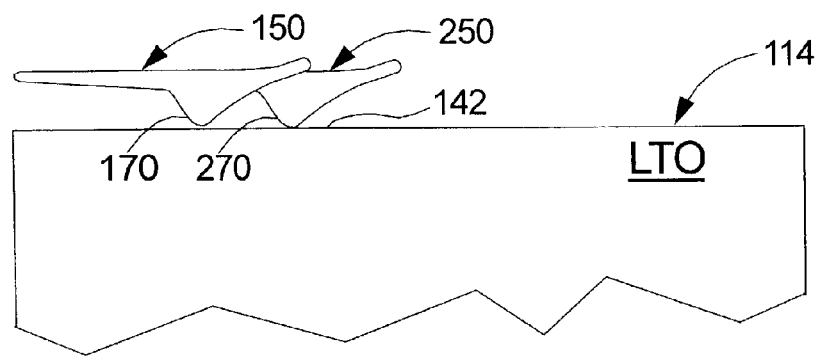
FIGS. 7(a) through FIG. 7(c) are simplified cut-away side views of the media-detection system shown in FIG. 6 illustrating operation thereof according to one embodiment.
Figure 7B:
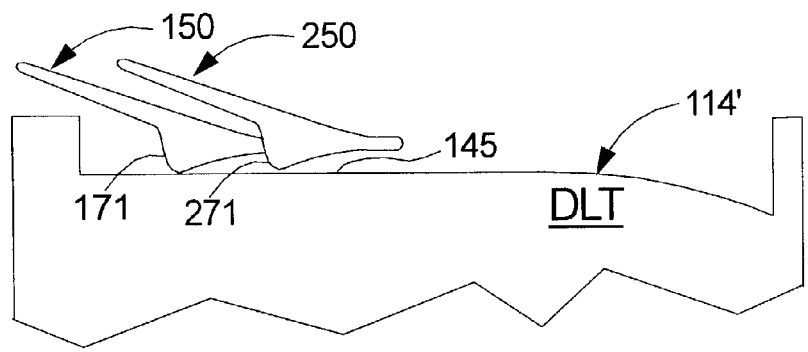
Figure 7C:
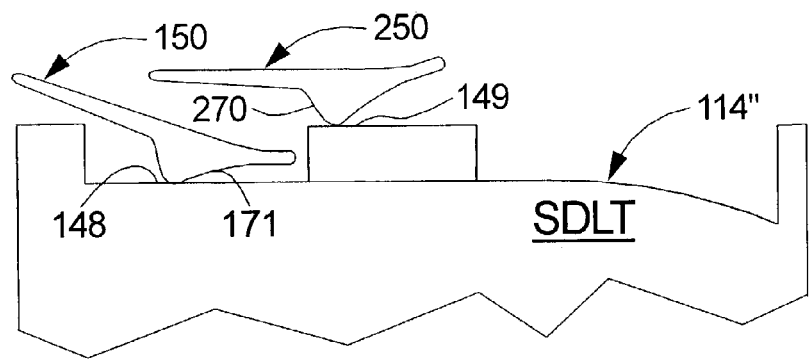
Figure 8:
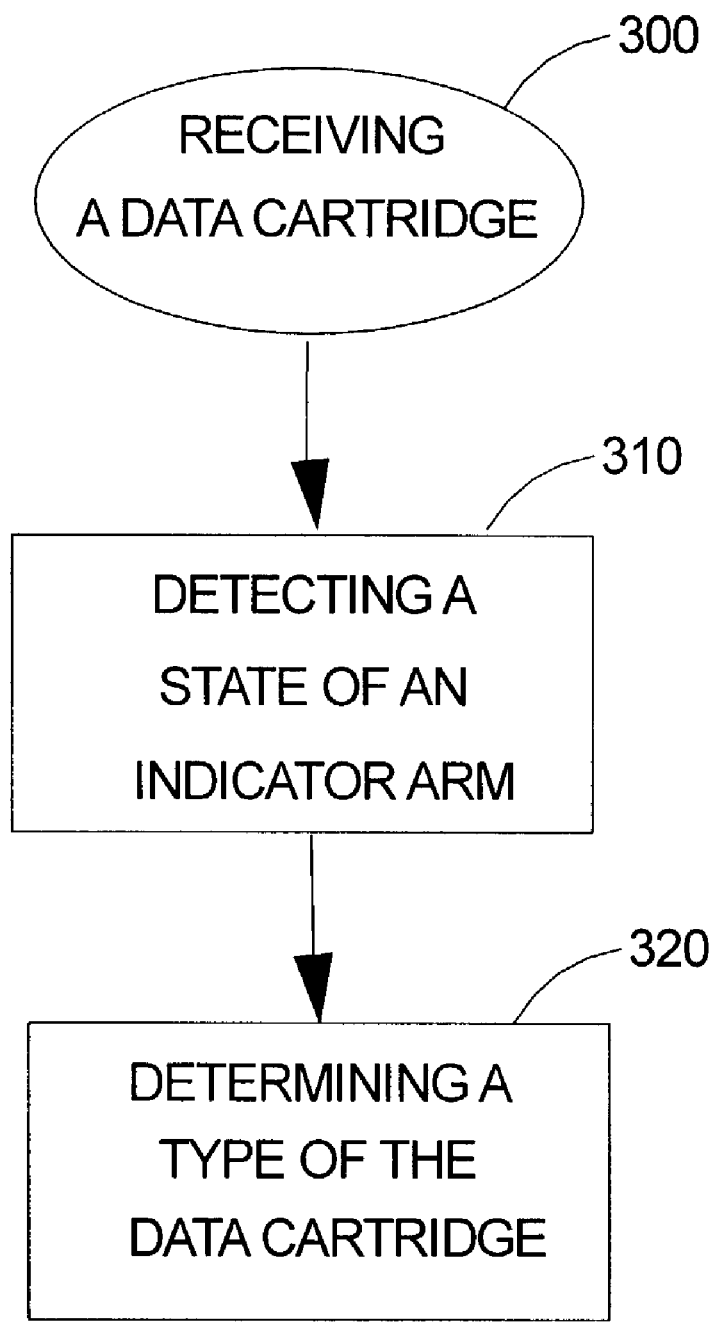
FIG. 8 is a flow chart illustrating operation of program code according to one embodiment of the invention.

The media-detection system 110 may be operated according to one embodiment of the invention as follows as illustrated in FIGS. 7(a) through 7(c) and in the flow chart of FIG. 8. The data cartridge is received in the cartridge-engaging assembly 18 in step 300. As the data cartridge 14 is received, the state of the indicator arm(s) 50 is determined in step 310. Based on the state of the indicator arm(s) 50, the type of data cartridge 14 is determined in step 320.

As an illustration, FIG. 7(a) shows an LTO data cartridge 14 fully-loaded in chamber 30 after being receiving in the cartridge-engaging assembly 18. During loading, indicator arms 150, 250 are raised on surface 142 of the LTO data cartridge 114 to positions 170, 270, respectively. Both flags 160, 260 remain within range of the respective sensors 162, 262 (e.g., each are in a "HIGH" state) during loading. Accordingly, in this example the states "HIGH" and "HIGH" for each indicator arm 150, 250 during loading of the data cartridge correspond to the LTO-type data cartridge 14.

In FIG. 7(b), DLT data cartridge 114' is shown fully-loaded in chamber 30 after being received in the cartridge-engaging assembly 18. Indicator arms 150, 250 go from a raised position into depression 145 formed on the top surface of DLT data cartridge 114' (i.e., lowered positions 171, 271, respectively). After going from a "HIGH" state initially, both flags 160, 260 remain out of range of the respective sensors 162, 262 (e.g., each are in a "LOW" state) during loading. Accordingly, in this example the states "HIGH" and "HIGH" followed by "LOW" and "LOW" for each indicator arm 150, 250 as the data cartridge is loaded correspond to the DLT-type data cartridge 114'.

In FIG. 7(c), SDLT data cartridge 114" is shown fully-loaded in chamber 30 of the cartridge-engaging assembly 18. One of the indicator arms 150 goes from a raised position into depression 148 formed on the top surface of SDLT data cartridge 114" (i.e., lowered position 171) during loading. The other indicator arm 250 goes from a raised position into depression 148 and then back to a raised position (i.e., on tab 149 in upper position 270). Flag 160 goes from a "HIGH" state to a "LOW" state during loading, while flag 260 goes from a "HIGH" state to a "LOW" state and again to a "HIGH" state. Accordingly, in this example the states during loading of the data cartridge correspond to the SDLT-type data cartridge 114".

Additional indicator arms may be used in another embodiment to detect other surface features of the data cartridges. Also, for example, the indicator arm(s) may be mounted in other suitable locations to detect other surface features of the data cartridges.

It is also to be understood that media-detection system 10 may be used with any cartridge-receiving device, and is not limited to use with cartridge-engaging assembly 18. For example, media detection system 10 may be used to determine the type of data cartridge 14 in storage magazine(s) 16 and/or read/write device 20.

What is claimed is:

1. A media-detection system for identifying a type of data cartridge, comprising:
    at least one indicator arm displaceable by at least one surface feature of the data cartridge as the data cartridge is loaded in a cartridge-receiving device; and
    at least one sensor detecting a first combination of plural displacements of said at least one indicator arm as the data cartridge is loaded, thereby indicating a first type of data cartridge in the cartridge-receiving device, the plural displacements comprising a first displacement of the indicator arm caused by a first surface feature of the data cartridge, and a second displacement of the indicator arm caused by a second surface feature of the data cartridge,
    wherein the at least one sensor outputs indications of plural states corresponding to the first combination of plural displacements for indicating the data cartridge of the first type.

2. The media-detection system of claim 1, wherein said indicator arm is pivotally mounted to said cartridge-receiving device.

3. The media-detection system of claim 1, further comprising a control system operatively associated with said at least one sensor, said control system receiving the indications of plural states corresponding to the first combination of plural displacements and determining that the data cartridge in the cartridge-receiving device is of the first type based on the received indications.

4. The media-detection system of claim 1, wherein the first type of data cartridge is selected from the types comprising LTO, DLT, and SDLT data cartridges.

5. The media-detection system of claim 1, further comprising at least one flag operatively associated with said at least one indicator arm, said flag indicating to said at least one sensor the displacement of said at least one indicator arm.

6. The media-detection system of claim 5, wherein said at least one flag is movable into and out of range of said at least one sensor to indicate a state of said at least one indicator arm.

7. The media-detection system of claim 1, further comprising another indicator arm, wherein each indicator arm is displaceable by separate surface features of the data cartridge when the data cartridge is loaded in the cartridge-receiving device.

8. The media-detection system of claim 1, wherein said at least one sensor detects the displacements of said at least one indicator arm as the data cartridge is loaded past a plurality of predetermined positions in the cartridge-receiving device.

9. The media-detection system of claim 1, wherein said at least one indicator arm is resiliently biased toward a lower position when the cartridge-receiving device is empty and displaceable to a raised position as the data cartridge is loaded in the cartridge-receiving device.

10. The media-detection system of claim 1, wherein said at least one sensor is an optical sensor.

11. The media-detection system of claim 1, wherein said at least one sensor is a mechanical switch.

12. The media-detection system of claim 1, wherein the at least one sensor detects a second combination of plural displacements of the at least one indicator arm as the data cartridge of a second type is loaded into the cartridge-receiving device, the second combination of plural displacements comprising a first displacement of the indicator arm caused by a first surface feature of the second type data cartridge, a second displacement of the indicator arm caused by a second surface feature of the second type data cartridge, and a third displacement of the indicator arm caused by a third surface feature of the second type data cartridge, wherein the at least one sensor outputs another set of indications of plural states corresponding to the second combination of plural displacements for indicating the second type data cartridge.

13. A method for identifying a type of data cartridge, comprising:

receiving the data cartridge in the cartridge-receiving device;

detecting, using plural sensors, states of respective plural indicator arms while the data cartridge is being received in the cartridge-receiving device; and determining the type of data cartridge being received in the cartridge-receiving device based on indications of the states of the plural indicator arms provided by the sensors.

14. The method of claim 13, wherein detecting the states of the plural indicator arms is based on displacements of the indicator arms by at least one surface feature of the data cartridge.

15. The method of claim 13, wherein detecting the states of the indicator arms occurs at at least one predetermined position of the data cartridge during receiving of the data cartridge in the cartridge-receiving device.

16. The method of claim 13, wherein detecting the states of the indicator arms occurs after the data cartridge is fully-loaded into said cartridge-receiving device.

17. A media-detection system for identifying a type of data cartridge, comprising:

indicator means for indicating at least one surface feature of a data cartridge as the data cartridge is being received in a cartridge-receiving means; and sensor means for detecting the at least one surface feature indicated by said indicator means, wherein the type of data cartridge being received in the cartridge-receiving means is based on the at least one surface feature detected by said sensor means.

18. The media-detection system of claim 17, further comprising means for determining the position of the data cartridge in the cartridge-receiving means, wherein the type of data cartridge is based on the at least one surface feature detected by said sensor means in combination with the position of the data cartridge.

19. The media-detection system of claim 17, further comprising means for determining the type of data cartridge based on at least two surface features of the data cartridge.

20. The media-detection system of claim 17, further comprising control means for determining the type of data cartridge based on the at least one surface feature detected by said sensor means.

21. A media-detection system for identifying a type of data cartridge, comprising:

computer-readable storage media;

computer-readable program code stored on said computer-readable storage media, said computer readable program code comprising:

program code for receiving indications of states of at least one indicator arm while the data cartridge is being received in a cartridge-receiving device;

program code for determining a first type of data cartridge being received in the cartridge-receiving device based on a first set of indications that indicate the at least one indicator arm was displaced by a first feature of the first type data cartridge with the first type data cartridge at a first location in the cartridge-receiving device, and the at least one indicator arm was displaced by a second feature of the first type data cartridge with the first type data cartridge at a second location in the cartridge-receiving device; and program code for determining a second type of data cartridge being received in the cartridge-receiving device based on a second set of indications that indicate the at least one indicator arm was displaced by a first feature of the second type data cartridge with the second type data cartridge at a first location in the cartridge-receiving device, the at least one indicator arm was displaced by a second feature of the second type data cartridge with the second type data cartridge at a second location in the cartridge-receiving device, and the at least one indicator arm was displaced by a third feature of the second type data cartridge with the second type data cartridge at a third location in the cartridge-receiving device.

\* \* \* \* \*